US007505085B2

(12) United States Patent
Park

(10) Patent No.: US 7,505,085 B2
(45) Date of Patent: Mar. 17, 2009

(54) APPARATUS AND METHOD FOR IMPROVING RECOGNITION PERFORMANCE FOR DARK REGION OF IMAGE

(75) Inventor: Jung-Hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 714 days.

(21) Appl. No.: 11/280,413

(22) Filed: Nov. 17, 2005

(65) Prior Publication Data

US 2006/0109221 A1 May 25, 2006

(30) Foreign Application Priority Data

Nov. 23, 2004 (KR) ..................... 10-2004-0096263

(51) Int. Cl.
*H04N 5/57* (2006.01)
*G06G 9/00* (2006.01)

(52) U.S. Cl. ...................................... 348/687; 382/167

(58) Field of Classification Search ................. 348/687, 348/688, 607, 673; 382/167–169; 345/589–591
See application file for complete search history.

(56) References Cited

U.S. PATENT DOCUMENTS

| | | | | |
|---|---|---|---|---|
| 5,142,272 | A * | 8/1992 | Kondo | 345/550 |
| 5,510,843 | A * | 4/1996 | Keene et al. | 348/446 |
| 5,642,204 | A | 6/1997 | Wang et al. | |
| 6,603,104 | B1 * | 8/2003 | Lee | 250/205 |
| 6,664,973 | B1 * | 12/2003 | Iwamoto et al. | 345/589 |
| 7,042,524 | B2 * | 5/2006 | Onagawa | 348/687 |
| 7,167,214 | B2 * | 1/2007 | Hirosue | 348/687 |
| 2002/0163527 | A1 * | 11/2002 | Park | 345/594 |
| 2003/0222841 | A1 * | 12/2003 | Hirosue | 345/89 |
| 2003/0234866 | A1 * | 12/2003 | Cutler | 348/207.1 |
| 2004/0105032 | A1 * | 6/2004 | Kim et al. | 348/607 |

FOREIGN PATENT DOCUMENTS

| | | |
|---|---|---|
| EP | 1158779 | 11/2001 |
| EP | 1229511 | 8/2002 |
| WO | WO 2005-109391 | 11/2005 |

* cited by examiner

*Primary Examiner*—Paulos M Natnael
(74) *Attorney, Agent, or Firm*—Roylance, Abrams, Berdo & Goodman, LLP

(57) ABSTRACT

An apparatus and method are provided for displaying an image. A process of human color recognition and a process of human color response are analyzed to find a reference brightness value of an image such that a dark region of the image can be correctly detected. A brightness of the image is adjusted such that a specific region is not excessively bright or dark. Accordingly, a user can recognize the image. The apparatus and method can be applied to an image display device having a Liquid Crystal Display (LCD), such as a portable wireless terminal having a small-sized LCD.

16 Claims, 6 Drawing Sheets

(a)

(b) (c)

(d)

APPARATUS AND METHOD FOR IMPROVING RECOGNITION PERFORMANCE FOR DARK REGION OF IMAGE

PRIORITY

This application claims the benefit under 35 U.S.C. § 119 (a) of a Korean Patent Application entitled "Apparatus and Method for Improving Recognizing Performance of Darkness of Image" filed in the Korean Intellectual Property Office on Nov. 23, 2004 and assigned Serial No. 2004-96263, the entire contents of which are hereby incorporated by reference.

BACKGROUND OF THE INVENTION

1. Field of the Invention

The present invention relates to an image display device and method for improving an image darkness recognition performance. More particularly, the present invention relates to an image display device having a Liquid Crystal Display (LCD) for improving an image darkness recognition performance, in which a reference brightness value of an image is detected by analyzing a process of human color recognition and a process of human color response such that a dark region of the image can be correctly recognized, and method for improving an image darkness recognition performance thereof. A brightness of the image is adjusted such that a specific region is not excessively bright or dark, and the user can recognize the image.

2. Background of the Prior Art

Portable wireless terminals, such as a mobile communication terminal and a Personal Digital Assistant (PDA), have become popular. Using the portable wireless terminals, the users can make a telephone call and manage their schedules. In addition, the users can take a picture with a built-in camera module and watch satellite broadcasting. Thus, the features of the portable wireless terminals have become popular.

Portable wireless terminals with displays have a problem concerning image quality. Features of still picture images taken by a digital camera may be adjustable based on the environment. Thus, a recognition performance for the darkness of the image does not matter. However, when a moving picture is displayed or the user watches real-time broadcasting, it is often difficult to correctly recognize a specific image due to a small-sized display of the portable wireless terminal. For example, it is difficult to correctly recognize some images, such as an image taken against the light, an image of a dark object taken at a dark place, and an image taken of an object that is lighter than its surroundings but still dark.

Most of the recent portable wireless terminals use liquid crystal displays (LCDs) as displays. Liquid crystal is an intermediary substance between a liquid state and a solid state depending on temperature. Liquid crystal generally is in a solid state at a temperature lower than 40-50 degrees below zero. Therefore, the LCD cannot be used as a display at that temperature. When a voltage is applied to the LCD at room temperature, the liquid crystal changes from a disordered liquid state to a liquid-solid state.

FIG. 1 is a perspective diagram illustrating a physical structure of a conventional Twist Nematic (TN) LCD.

Referring to FIG. 1, the TN LCD comprises polarizing filters, alignment layers, and a liquid crystal layer. The polarizing filters are arranged along the perpendicular polarizing axes and the light twists 90 degrees as it passes through the liquid crystals. In the TN LCD, the liquid crystals are controlled by the voltage. When the voltage is applied, the liquid crystal molecules are rearranged vertically. When the voltage is removed, the liquid crystal molecules have no order. In such a state of disorder, the TN LCD cannot operate as a display. In order to solve the above problem, a continuous property of the liquid crystal, such as the arrangement of the liquid crystal molecules is affected by neighboring molecules, is utilized. If one end of the liquid crystal is anchored, all liquid crystal molecules are not erected when the voltage is applied, but smoothly inclined from a lower side to an upper side with respect to the anchored axis. Meanwhile, when the voltage is removed, the erected liquid crystal molecules are inclined in a direction of the anchored axis because of the continuous property.

However, where the continuous property is used, a perfect black region cannot be obtained due to the inherent physical structure of the LCD. Also, some of the light may be transmitted. That means that the LCD structure easily expresses a bright region but has difficulty expressing a dark region.

Human visual recognition for a low brightness image is greater for a large-sized monitor, for example, a TV monitor than a small-sized LCD mounted on a portable wireless terminal. In addition, when an image has both a bright region and a dark region, human visual adaptation for the recognition performance for the dark region is high. However, for the LCD of the portable wireless terminal which is small-sized, human eye tends to be adapted to the brightness of the image displayed on the LCD. Due to this tendency, a dark image cannot be correctly detected when a bright region and a dark region coexist.

That is, the image display device having the LCD has a limitation in expressing the darkness of the image due to the physical structure of the LCD. Also, users tend to adjust to the brightness of the small image and therefore, a dark image cannot be correctly detected. That is, since human visual adjustment for the dark region of the small image for the LCD is low, it is difficult to detect the displayed image

SUMMARY OF THE INVENTION

The present invention provides an apparatus and method for improving a recognition performance for a dark region of an image in an image display device having a liquid crystal display (LCD).

Also, the present invention provides an apparatus and method for improving a recognition performance for a dark region of an image in a portable wireless terminal having a small-sized LCD.

Further, the present invention provides an apparatus and method for improving a recognition performance for a dark region of an image in a portable wireless terminal by analyzing a process of human color recognition and a process of human color response.

Hereinafter, a term "original red, green, and blue (RGB) format image" represents an original image having color information expressed in an RGB format, and a term "original luminance, chrominance of blue component, and chrominance of red component (YUV) format image" represents an original image having color information expressed in a YUV format. Here, the Y component is luminance (or brightness) and the U and V components are chrominance. Also, a term "converted RGB format image" is an image that is expressed in the RGB format and is converted from the original image by the method of the present invention, and a term "converted YUV format image" is an image that is expressed in the YUV format and is converted from the original image by the method of the present invention. In the process of converting a brightness value of the original YUV format image into a corresponding mapped brightness value of a mapping table, a term "mapping brightness value" represents mapped brightness value of a mapping table.

According to an exemplary aspect of the present invention, an image display device having a LCD comprises a memory for storing a reference brightness value and a mapping table, the reference brightness value being a preset value for determining whether to adjust a dark region of an original YUV format image, the adjustment of the dark region being determined by comparing the reference brightness value with an average brightness value of the entire original YUV format image, the mapping table being used to obtain a brightness mapping value corresponding to each brightness value of pixels when the adjustment of the dark region is determined, a controller for converting an original RGB format image into the original YUV format image, calculating the average brightness value of the entire original YUV format image, determining whether the average brightness value is less than the reference brightness value, mapping the brightness value of each pixel of the original YUV format image into a corresponding brightness mapping value of the mapping table when the average brightness value is less than the reference brightness value, and converting the converted YUV format image into a converted RGB format image; and the LCD for displaying the converted RGB format image.

According to another exemplary aspect of the present invention, a method for displaying an image in an image display device having a liquid crystal display (LCD) comprises the steps of setting a reference brightness value used to determine whether to adjust a dark region of an original luminance, chrominance of blue component, and chrominance of red component (YUV) format image; determining whether to adjust the dark region of the original YUV format image by comparing the reference brightness value with an average brightness value of the entire original YUV format image, if the adjustment of the dark region is determined, setting a mapping table for calculating a brightness mapping value corresponding to a brightness value of each pixel; converting an original RGB format image into the original YUV format image; calculating an average brightness value of the entire original YUV format image; determining whether the average brightness value is less than the reference brightness value; if the average brightness value is less than the reference brightness value, mapping the brightness value of each pixel of the original YUV format image into a corresponding brightness mapping value of the mapping table; converting the converted YUV format image produced as the mapping result into a converted RGB format image; and displaying the converted RGB format image.

It is to be understood that both the foregoing general description and the following detailed description of the present invention are exemplary.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
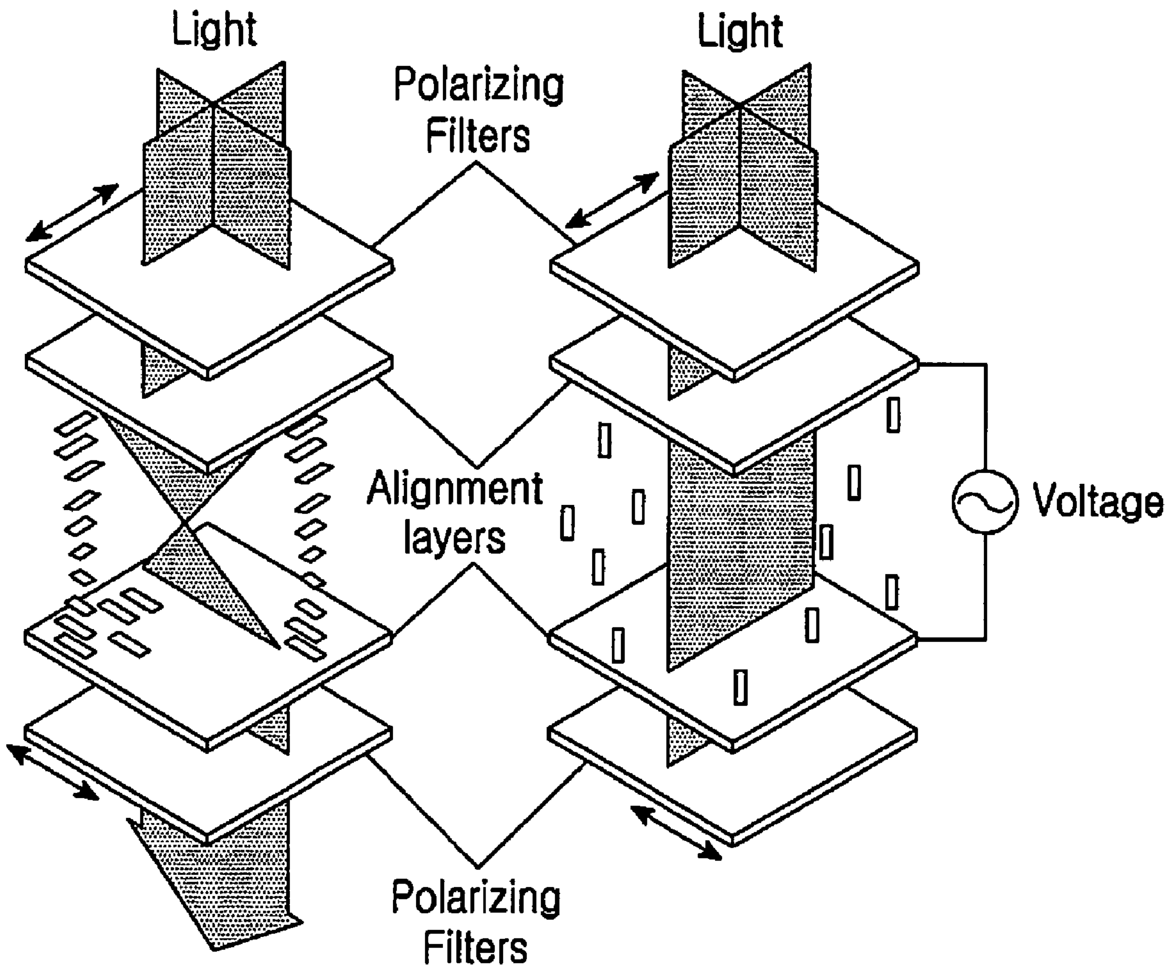
FIG. 1 PRIOR ART
FIG. 1 is a perspective diagram illustrating a physical structure of a conventional LCD.

Hereinafter, exemplary embodiments of the present invention will be described with reference to the accompanying drawings. Also, in the following description, a detailed description of known functions and configurations incorporated herein will be omitted for clarity and conciseness.

An apparatus and method for displaying an image according to exemplary embodiments of the present invention can be applied to all image display devices having a general display. Hereinafter, a portable wireless terminal having a liquid crystal display (LCD) as a display will be described as an example.

A principle of human color recognition is based on the light intensity arriving at the visual cells of the human eye. There are various methods of expressing the human color recognition with a quantitative value.

A representative method is to express the human color recognition with red, green and blue values (RGB color model). The color can be expressed using the combination of the red, green and blue colors. Human can recognize a specific color of an object based on the strength of the RGB colors.

Another method is a luminance, chrominance of blue component, and chrominance of red component (YUV) color model that is derived from the fact that human eyes are more sensitive to a luminance than a chrominance. Y represents the luminance, U represents the chrominance of the blue component, and V represents the chrominance of the red component. Like the RGB method, the YUV method is used to express a specific color.

The correlation between the YUV method and the RGB method can be given by Equations 1 and 2 below.

$$Y=0.3R+0.59G+0.11B$$

$$U=(B-Y)\times 0.493$$

$$V=(R-Y)\times 0.877 \quad (1)$$

$$R=Y+0.956U+0.621V$$

$$G=Y+0.272U+0.647V$$

$$B=Y+1.1061U+1.703V \quad (2)$$

Since the human eyes are sensitive to light, a 4:2:2 YUV format is used instead of a 1:1:1 YUV format. That is, the Y component is larger than the U and V components.

This exemplary embodiment of present invention notes the fact that human eyes are more sensitive to the luminance than the chrominance. Unlike the conventional method of adjusting an entire brightness of an image, the method of an exemplary embodiment of the present invention adjusts brightness by pixel unit.

When an image is displayed using a method according to exemplary embodiment of the present invention, the brightness of the image is calculated with respect to each pixel and then the average brightness value of all pixels of the image is calculated. The average brightness value can be calculated by dividing the sum of all pixels' Y values by the image size. That is, the average brightness value can be calculated using a subroutine below.

```
Subroutine 1
RGB→YUV
for (0 to height of image)
  for (0 to width of image)
  average value +=Y;

average value=average value/(height of image×width
    of image)
```

In displaying the image, it is important that the image must be correctly detected without user discomfort. If a dark region is brightened and a bright region is darkened, the image may not be clear. In the case of an image having a dark region and a bright region illuminated by sunlight or the like, the dark region is brightened, while the bright region is brightened slightly compared with an original brightness.

An average brightness value of an original image to be displayed is compared with a reference brightness value, which is predetermined and stored in the image display device. If the average brightness value is less, which indicates darker, than the reference brightness value, the dark region of the original image is adjusted such that the recognition performance can be improved. The reference brightness value may vary according to the characteristic of the image display device, for example an ability to express a dark region.

During the process of improving the recognition performance for the dark region, only the brightness value must be adjusted without changing the chrominance information. The brightness value can be adjusted using a mapping table which is made based on a limitation of the ability to express the dark region on the LCD.

Figure 2:
FIG. 2A is an image illustrating a non-processed picture.
FIG. 2B is an image illustrating a picture processed via conventional brightening of the picture of FIG. 2A.
FIG. 2C is an image illustrating a picture processed via conventional darkening of the picture of FIG. 2A.
FIG. 2D is an image illustrating a picture after improving a recognition performance for a dark region according to an exemplary embodiment of the present invention.
Figure 2:
Figure 2:
Figure 2:

The method for improving the recognition performance for the dark region of the image will now be described in detail with reference to FIG. 2.

FIGS. 2A through 2C are images illustrating a non-processed picture, a picture processed via conventional brightening of the picture of FIG. 2A, and a picture processed via conventional darkening of the picture of FIG. 2A, respectively. According to the prior art, the recognition performance for the dark region is improved by increasing an entire brightness of the image like FIG. 2B.

FIG. 2D is an image illustrating a picture after improving the recognition performance for the dark region according to an exemplary embodiment of the present invention. Referring to FIG. 2D, the dark region is brightened greatly and the bright region is brightened slightly. In this manner, the recognition performance for the dark region can be improved and the natural image can be provided.

If the Y component of the YUV format is expressed with 8 bits, the brightest state and the darkest state can be denoted by 255 and 0, respectively. The brightness value becomes less as the image is brighter, and the brightness value becomes larger as the brightness becomes closer to 0. Table 1 shows the brightness values measured from some pixels of the images shown in FIG. 2.

TABLE 1

| | FIG. 2A (Original) | FIG. 2B (Brightened) | FIG. 2C (Darkened) | FIG. 2D (The present invention) |
|---|---|---|---|---|
| Right eye | 9 | 34 | 0 | 20 |
| Teeth | 20 | 43 | 0 | 35 |
| Nose | 46 | 68 | 29 | 59 |
| Left forehead | 90 | 100 | 75 | 91 |

In Table 1, the right eye region (the dark region in the original image) is brightened more than two times, while the left forehead region (the bright region in the original image) is slightly changed.

If the luminance value (Y) of the YUV format is determined, the YUV color space (domain) is converted into the RGB color space (domain) and then the converted image is displayed.

Figure 3:
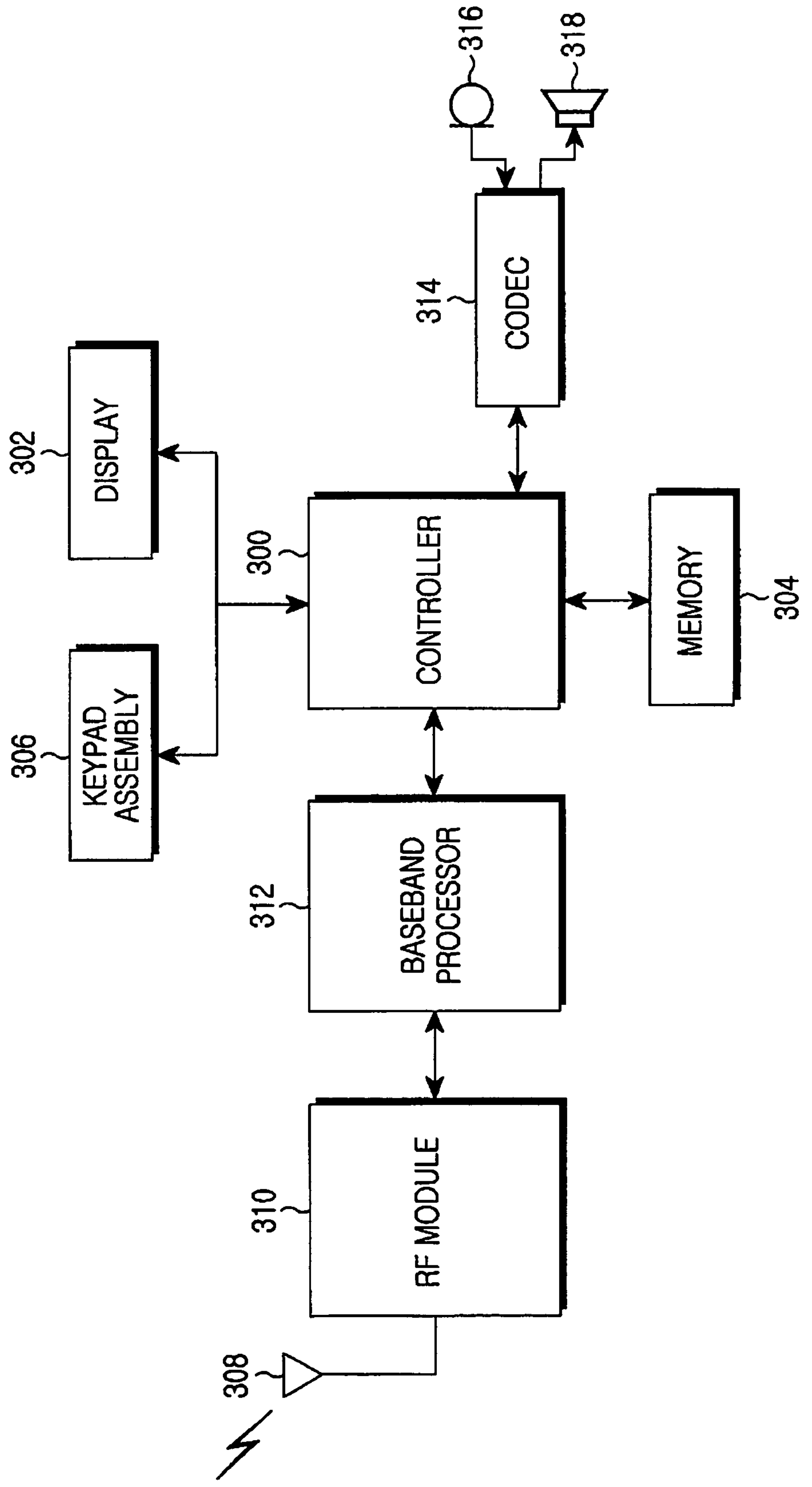
FIG. 3 is a block diagram illustrating a portable wireless terminal according to an exemplary embodiment of the present invention.

FIG. 3 is a block diagram illustrating a portable wireless terminal according to an exemplary embodiment of the present invention, in which the recognition performance for the dark region can be improved.

Referring to FIG. 3, the portable wireless terminal comprises a controller 300, a display 302, a memory 304, a keypad assembly 306, an antenna 308, a radio frequency (RF) module 310, a baseband processor 312, a CODEC 314, a microphone 316, and a speaker 318.

The controller 300 controls an overall operation of the portable wireless terminal. Also, when the average brightness of the image to be displayed is dark, the controller 300 increases the recognition performance for the dark region, thereby providing an optimized image to the user.

The memory 304 stores a control program, a reference brightness value, and a mapping table. The control program is used to control the general operation of the portable wireless terminal. The reference brightness value is a preset value, which will be used to determine whether to adjust a dark region of an original YUV format image. An average brightness value of an entire YUV format image is compared with the reference brightness value. The mapping table is used to obtain a brightness mapping value corresponding to each brightness value of the pixels when the adjustment of the dark region is required.

The display 302 is used to display various signals and color information. A LCD is generally used as the display 302.

Figure 4:
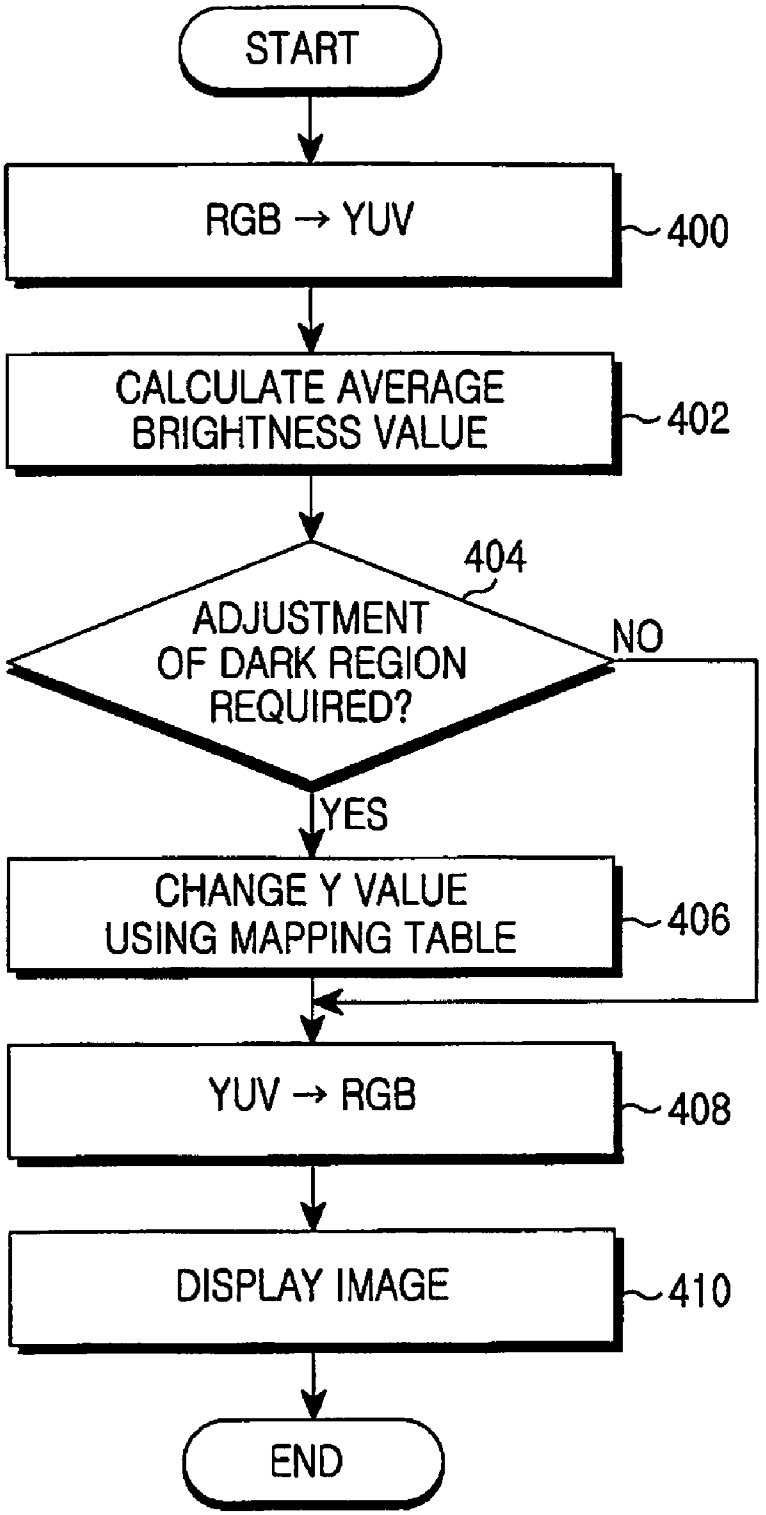
FIG. 4 is a flowchart illustrating a method for improving a recognition performance for a dark region of an image according to an exemplary embodiment of the present invention.

FIG. 4 is a flowchart illustrating a method for improving the recognition performance for the dark region according to an exemplary embodiment of the present invention. The controller 300 calculates the average brightness value of the original image and improves the recognition performance for the dark region by using the mapping table and the reference brightness value, and then the improved image is displayed.

In step 400, in order to calculate the average brightness value and change the luminance value (Y), the controller 300 converts a RGB format image into a YUV format image by using Equation 1. In step 402, the controller 300 calculates the average brightness value of the original YUV format image by using the Y value of the original YUV format image. This process can be performed using the above subroutine 1.

In step 404, the controller 300 determines whether the average brightness value of the original YUV format image is greater than the reference brightness value which is stored in the memory 304 and determined according to the characteristic of the LCD, for example the ability to express the dark region. In step 408, when the average brightness value is greater than the reference brightness value, that is, when the original RGB format image is so bright that the image can be displayed without degradation of the recognition performance for the dark region, the controller 300 converts the original YUV format image into the original RGB format image. In step S410, the converted image is displayed.

In steps 404 and 406, when the average brightness value of the original YUV format image is less than the reference brightness value, that is, when the original RGB format image is so dark that the recognition performance for the dark region is low, the original YUV format image is converted using the brightness mapping value corresponding to the luminance value (Y) of each pixel in the mapping table, which is stored in the memory 304 and is determined according to the characteristic of the LCD, for example the ability to express the dark region. In this manner, the converted YUV format image is obtained.

In step 408, the controller 300 converts the YUV format image into the RGB format image by using Equation 2 so as to display the YUV format image of the step 400 on the display 302. In step 410, the converted RGB format image is displayed on the display 302. Therefore, the image can be displayed with the improved recognition performance for the dark region.

Instead of the mapping table, the brightness value can be adjusted by using a brightness variable value, which is calculated by using an exponential function. This method will now be described in detail with reference to FIG. 5.

Figure 5:
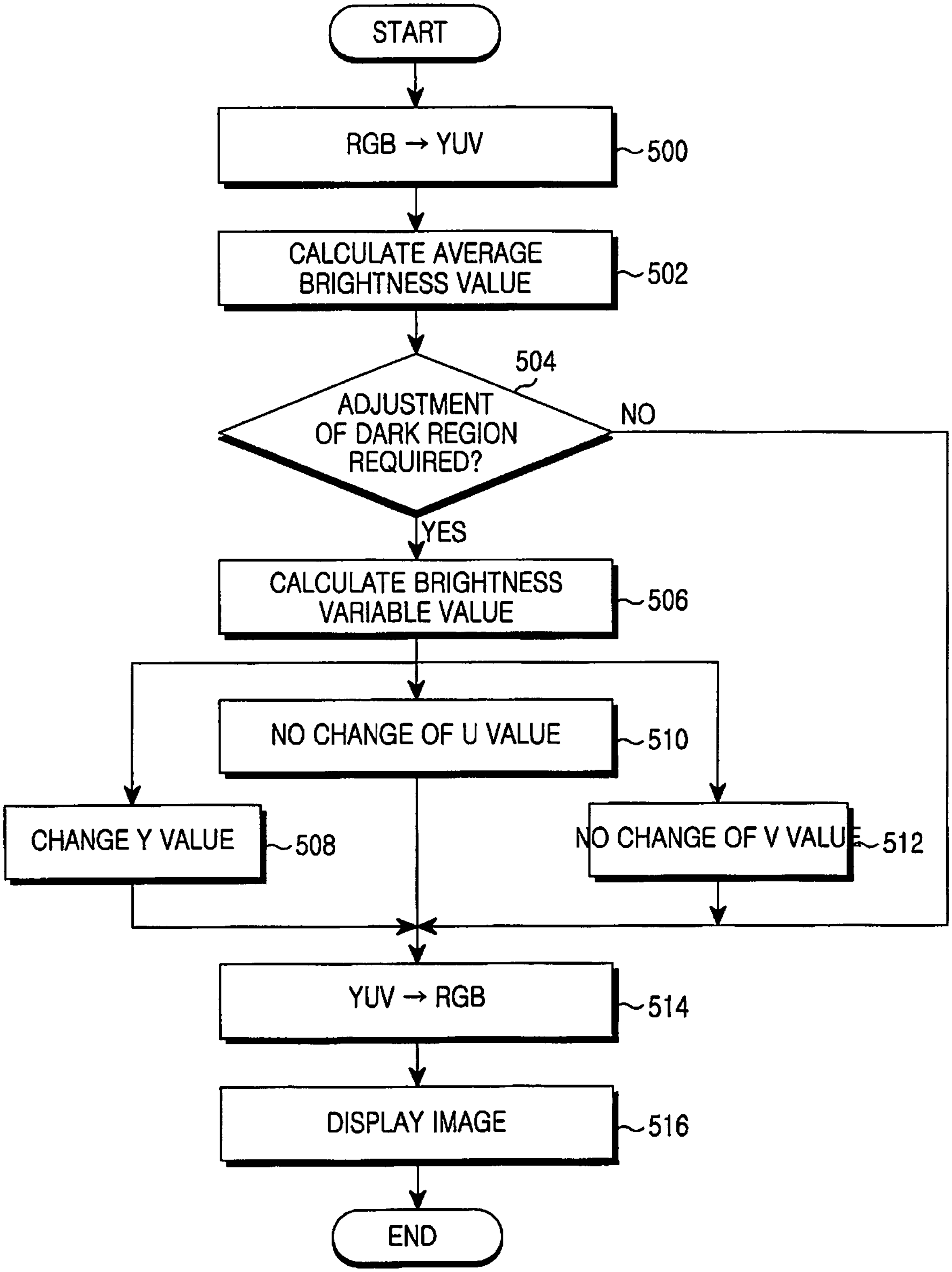
FIG. 5 is a flowchart illustrating a method for improving a recognition performance for a dark region of an image according to an exemplary embodiment of the present invention.

FIG. 5 is a flowchart illustrating a method for improving a recognition performance for a dark region according to an exemplary embodiment of the present invention. In this embodiment, the controller 300 calculates the average brightness value of the original image and improves the recognition performance by using the exponential function and the reference brightness value, which are stored in the memory 304.

In step 500, in order to calculate the average brightness value and change the luminance value (Y), the controller 300 converts a RGB format image into a YUV format image by using Equation 1. In step 502, the controller 300 calculates the average brightness value of the original YUV format image by using the Y value of the original YUV format image. This process can be performed by using the above subroutine 1.

In step 504, the controller 300 determines whether the average brightness value of the original YUV format image is greater than the reference brightness value which is stored in the memory 304 and determined according to the characteristic of the LCD, for example the ability to express the dark region. In step 514, when the average brightness value is greater than the reference brightness value, that is, when the original RGB format image is so bright that the image can be displayed without degradation of the recognition performance for the dark region, the controller 300 converts the original YUV format image into the original RGB format image. In step 516, the converted image is displayed.

In steps 504 and 506, when the average brightness value of the original YUV format image is less than the reference brightness value, that is, when the original RGB format image is so dark that the recognition performance for the dark region is low, the brightness variable value is calculated by using the exponential function, which is stored in the memory 304 and is determined according to the characteristic of the LCD, for example the ability to express the dark region.

In steps 508, 510 and 512, the controller 300 changes the brightness of the original YUV format image by using the brightness variable value.

In step 514, the controller 300 converts the YUV format image into the RGB format image by using Equation 2 so as to display the YUV format image of the step 500 on the display 302. In step 516, the converted RGB format image is displayed on the display 302. Therefore, the image can be displayed with the improved recognition performance for the dark region.

A method for calculating the brightness variable value will now be described with reference to FIG. 6.

Figure 6:
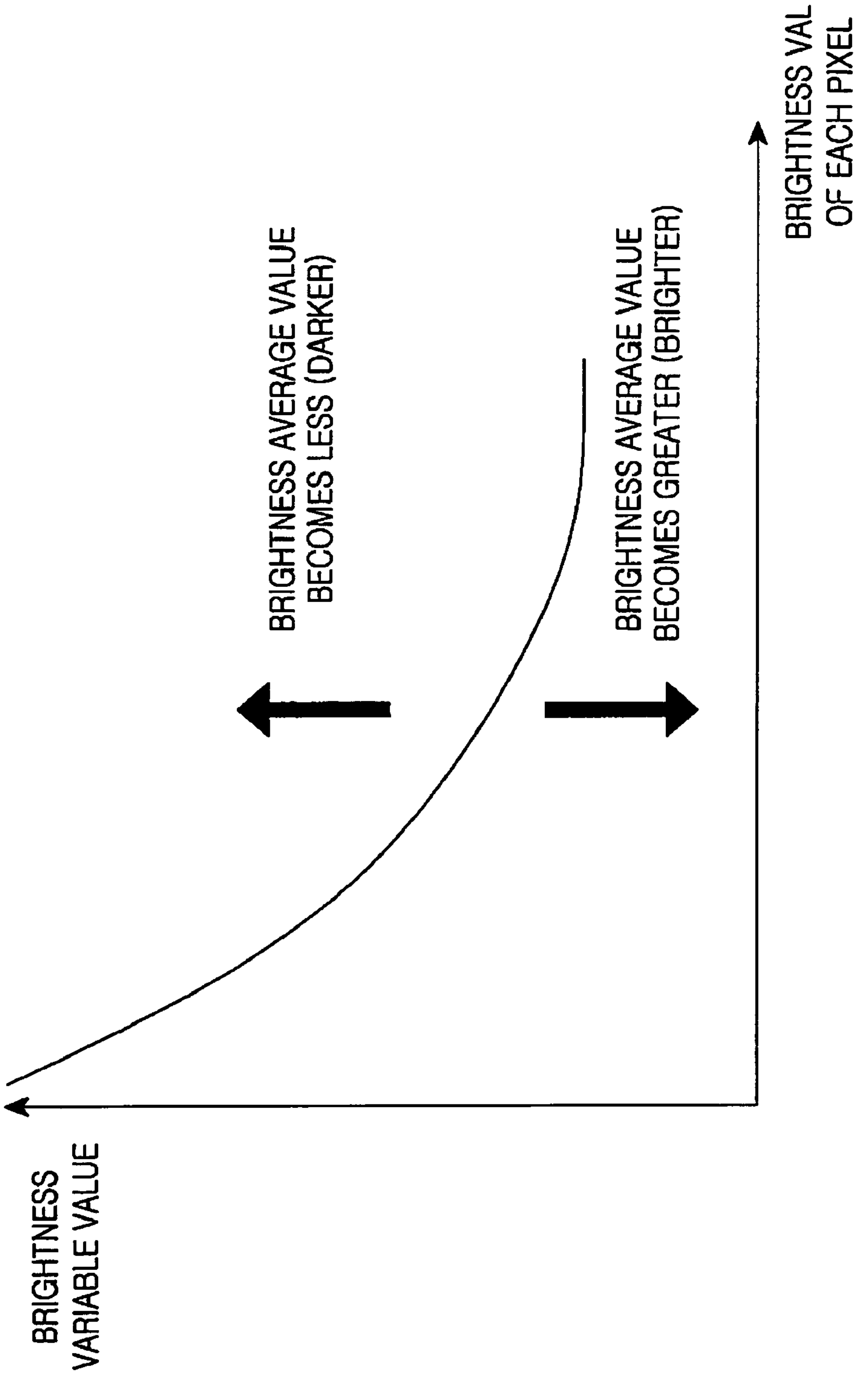
FIG. 6 is a diagram illustrating a brightness variable value with respect to a luminance value (Y) of each pixel.

FIG. 6 is a diagram illustrating the brightness variable value with respect to the luminance value (Y) of each pixel. The graph of the exponential function shown in FIG. 6 is exponentially decreased depending on the average brightness value of the original image. That is, the graph of the exponential function rises as the average brightness value becomes less (darker) and falls as the average brightness value becomes greater (brighter).

The exponentially decreasing function causes the image to be displayed more clearly than a monotonously decreasing function. Since the characteristic of the display 302 is different according to the manufacturers, the types and so on, the exponential functions for satisfying the characteristic of the display 302 are empirically determined.

As described above, the exemplary embodiments of the present invention is directed to overcome the inherent limitation in the ability to express the dark region in the LCD. In addition, the exemplary embodiments of the present invention can prevent the degradation of the recognition performance for the dark region of the image, which is caused in the portable wireless terminal having a small-sized display due to the limitation of human detect ability with respect to the dark region.

Further, the exemplary embodiments of the present invention can improve the recognition performance for the dark region in the LCD without any great change in the display platform. Specifically, in the case of the LCD mounted on the portable wireless terminal, the recognition performance for the dark region can be remarkably improved.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An image display device, comprising:

a memory for storing a reference brightness value and a mapping table, the reference brightness value being a predetermined value for determining whether to adjust a dark region of an original luminance, chrominance of blue component, and chrominance of red component (YUV) format image, the adjustment of the dark region being determined by comparing the reference brightness value with an average brightness value of the entire original YUV format image, the mapping table being used to obtain a brightness mapping value corresponding to each brightness value of pixels of the original YUV format image when the adjustment of the dark region is determined;

a controller for converting an original red, green, and blue (RGB) format image into the original YUV format image, calculating the average brightness value of the entire original YUV format image, determining whether the average brightness value is less than the reference brightness value, mapping the brightness value of each pixel of the original YUV format image into a corresponding brightness mapping value of the mapping table when the average brightness value is less than the reference brightness value, and converting the converted YUV format image into a converted RGB format image; and a display means comprising a liquid crystal display (LCD) for displaying the converted RGB format image.

2. The image display device of claim 1, wherein the original RGB format image is converted into the original YUV format image by using an equation comprising:

$$Y=0.3R+0.59G+0.11B$$

$$U=(B-Y)\times 0.493$$

$$V=(R-Y)\times 0.877$$

wherein Y refers to luminance, R refers to red, G refers to green, B refers to blue, U refers to chrominance of blue component, and V refers to chrominance of red component.

3. The image display device of claim 1, wherein the average brightness value is calculated by using a subroutine comprising:

```
for (0 to height of image)
    for (0 to width of image)
    average value +=Y;
```

average value=average value/(height of image×width of image)

wherein Y refers to luminance and the subroutine calculates average brightness by dividing the sum of all pixels' Y values by the image size.

4. The image display device of claim 1, wherein when the average brightness value is less than the reference brightness value, the adjustment of the dark region in the original YUV format image is determined.

5. The image display device of claim 1, wherein the converted YUV format image is converted into the converted RGB format image by using a set of equations comprising:

$$R=Y+0.956U+0.621V$$

$$G=Y+0.272U+0.647V$$

$$B=Y+1.1061U+1.703V$$

wherein R refers to red, Y refers to luminance, U refers to chrominance of blue component, V refers to chrominance of red component, G refers to green, and B refers to blue.

6. An image display device, comprising:

a memory for storing a reference brightness value and an exponential function, the reference brightness value being a preset value for determining whether to adjust a dark region of an original luminance, chrominance of blue component, and chrominance of red component (YUV) format image, the exponential function being used to calculate a brightness variable value used to obtain a brightness mapping value corresponding to a brightness value of each pixel of the original YUV format image when an average brightness value of the entire original YUV format image is less than the reference brightness value;

a controller for converting an original red green blue (RGB) format image into the original YUV format image, calculating the average brightness value of each pixels of the original YUV format image, determining whether the average brightness value is less than the reference brightness value, determining the brightness variable value corresponding to the average brightness value by using the exponential function when the average brightness value is less than the reference value, obtaining a converted YUV format image by using the brightness variable value to change the brightness value of the original YUV format image, and converting the converted YUV format image into a converted RGB format image; and a display means comprising a liquid crystal display (LCD) for displaying the converted RGB format image.

7. The image display device of claim 6, wherein brightness variable value of the exponential function is inversely proportional to the brightness value of each pixel of the original YUV format image.

8. A portable wireless terminal having a liquid crystal display (LCD), comprising:

a memory for storing a reference brightness value and a mapping table, the reference brightness value being a preset value for determining whether to adjust a dark region of an original luminance, chrominance of blue component, and chrominance of red component (YUV) format image, the adjustment of the dark region being determined by comparing the reference brightness value with an average brightness value of the entire original YUV format image, the mapping table being used to obtain a brightness mapping value corresponding to the brightness value of each pixel of the original YUV format image when the adjustment of the dark region is determined;

a controller for converting an original RGB format image into the original YUV format image, calculating the average brightness value of the entire original YUV format image, determining whether the average brightness value is less than the reference brightness value, mapping the brightness value of each pixel of the original YUV format image into a corresponding brightness mapping value of the mapping table when the average brightness value is less than the reference brightness value, and converting the converted YUV format image into a converted RGB format image; and the LCD for displaying the converted RGB format image.

9. A method for displaying an image in an image display device having a liquid crystal display (LCD), the method comprising the steps of:

setting a reference brightness value for determining whether to adjust a dark region of an original luminance, chrominance of blue component, and chrominance of red component (YUV) format image;

determining whether to adjust the dark region of the original YUV format image by comparing the reference brightness value with an average brightness value of the entire original YUV format image;

if the adjustment of the dark region is determined, setting a mapping table for calculating a brightness mapping value corresponding to a brightness value of each pixel of the original YUV format image;

converting an original red, green, and blue (RGB) format image into the original YUV format image;

calculating an average brightness value of the entire original YUV format image;

determining whether the average brightness value is less than the reference brightness value;

if the average brightness value is less than the reference brightness value, mapping the brightness value of each pixel of the original YUV format image into a corresponding brightness mapping value of the mapping table;

converting the converted YUV format image produced as the mapping result into a converted RGB format image; and displaying the converted RGB format image.

10. The method of claim 9, wherein the original RGB format image is converted into the original YUV format image by using a set of equations comprising:

$$Y=0.3R+0.59G+0.11B$$

$$U=(B-Y)\times 0.493$$

$$V=(R-Y)\times 0.877$$

wherein Y refers to luminance, R refers to red, G refers to green, B refers to blue, U refers to chrominance of blue component, and V refers to chrominance of red component.

11. The method of claim 9, wherein the average brightness value is calculated by using a subroutine comprising:

for (0 to height of image)
  for (0 to width of image)
  average value +=Y;

average value=average value/(height of image×width of image)

wherein Y refers to luminance and the subroutine calculates the average brightness by dividing the sum of all pixels' Y values by the image size.

12. The image display method of claim 9, wherein when the average brightness value is less than the reference brightness value, the adjustment of the dark region in the original YUV format image is determined.

13. The method of claim 9, wherein the converted YUV format image is converted into the converted RGB format image using a set of equations comprising:

$$R=Y+0.956U+0.621V$$

$$G=Y+0.272U+0.647V$$

$$B=Y+1.1061U+1.703V$$

wherein R refers to red, Y refers to luminance, U refers to chrominance of blue component, V refers to chrominance of red component, G refers to green, and B refers to blue.

14. A method for displaying an image in an image display device, the method comprising the steps of:

setting a reference brightness value used to determine whether to adjust a dark region of an original luminance, chrominance of blue component, and chrominance of red component (YUV) format image;

if an average brightness value of the entire original YUV format image is less than the reference brightness value, setting an exponential function for calculating a brightness variable value used to obtain a brightness mapping value corresponding to a brightness value of each pixel of the original YUV format image when an average brightness value of the entire original YUV format image is less than the reference brightness value;

converting an original red, green, and blue (RGB) format image into the original YUV format image;

calculating an average brightness value of each pixel of the original YUV format image;

determining whether the average brightness value is less than the reference brightness value;

if the average brightness value is less than the reference brightness value, determining the brightness variable value corresponding to the average brightness value by using the exponential function when the average brightness value is less than the reference value;

obtaining a converted YUV format image by using the brightness variable value to change the brightness value of the original YUV format image;

converting the converted YUV format image into a converted RGB format image; and displaying the converted RGB format image.

15. The method of claim 14, wherein a brightness variable value of the exponential function is inversely proportional to the brightness value of each pixel of the original YUV format image.

16. A method for displaying an image in a portable wireless terminal, the method comprising the steps of:

setting a reference brightness value for determining whether to adjust a dark region of an original luminance, chrominance of blue component, and chrominance of red component (YUV) format image;

if an average brightness value of the entire original YUV format image is less than the reference brightness value, setting an exponential function for calculating a brightness variable value used to obtain a brightness mapping value corresponding to a brightness value of each pixel of the original YUV format image when an average brightness value of the entire original YUV format image is less than the reference brightness value;

converting an original red, green, and blue (RGB) format image into the original YUV format image;

calculating an average brightness value of each pixel of the original YUV format image;

determining whether the average brightness value is less than the reference brightness value;

if the average brightness value is less than the reference brightness value, determining the brightness variable value corresponding to the average brightness value by using the exponential function when the average brightness value is less than the reference value;

obtaining a converted YUV format image by using the brightness variable value to change the brightness value of the original YUV format image;

converting the converted YUV format image into a converted RGB format image; and displaying the converted RGB format image.

* * * * *